United States Patent
Saida

(10) Patent No.: US 8,535,394 B2
(45) Date of Patent: Sep. 17, 2013

(54) METHOD FOR PRODUCTION OF SOLID ELECTROLYTE AND SOLID ELECTROLYTIC CAPACITOR

(75) Inventor: Yoshihiro Saida, Tokyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 824 days.

(21) Appl. No.: 12/097,669

(22) PCT Filed: Dec. 15, 2006

(86) PCT No.: PCT/JP2006/325088
§ 371 (c)(1),
(2), (4) Date: Jul. 25, 2011

(87) PCT Pub. No.: WO2007/069738
PCT Pub. Date: Jun. 21, 2007

(65) Prior Publication Data
US 2011/0286151 A1 Nov. 24, 2011

Related U.S. Application Data

(60) Provisional application No. 60/752,920, filed on Dec. 23, 2005.

(30) Foreign Application Priority Data

Dec. 16, 2005 (JP) ................................. 2005-363265

(51) Int. Cl.
*H01G 9/00* (2006.01)
(52) U.S. Cl.
USPC ........................................................ 29/25.03
(58) Field of Classification Search
None
See application file for complete search history.

(56) References Cited

U.S. PATENT DOCUMENTS

| 4,943,892 A * | 7/1990 | Tsuchiya et al. ............... 361/525 |
| 2002/0105777 A1* | 8/2002 | Monden et al. ............... 361/523 |
| 2006/0124470 A1* | 6/2006 | Zama et al. .................... 205/317 |

FOREIGN PATENT DOCUMENTS

| CN | 1422432 A | 6/2003 |
| EP | 0971382 A1 | 7/2001 |
| JP | 2803040 B2 | 9/1998 |
| JP | 3187380 B2 | 7/2001 |
| JP | 2004-035555 A | 2/2004 |
| JP | 2005-191126 A | 7/2005 |

* cited by examiner

*Primary Examiner* — Scott B Geyer
(74) *Attorney, Agent, or Firm* — Sughrue Mion, PLLC

(57) ABSTRACT

A method for producing a solid electrolyte, which includes the steps of applying a solution containing a five-membered heterocyclic compound as a polymerizable monomer on a substrate surface, and polymerizing the applied monomer to give a solid electrolyte. The monomer-containing solution contains the polymerizable monomer and at least one polymerizable compound selected from a dimer of the monomer and a trimer of the monomer, at a proportion satisfying the equation:

$$A/(B+C)=100\text{-}1{,}000{,}000$$

where
A: concentration of the polymerizable monomer,
B: concentration of the dimmer in terms of the concentration of its monomer, and
C: concentration of the trimer in terms of the concentration of its monomer. In another aspect, a method is disclosed wherein a solution of a compound having a thiophene skeletal structure, which solution has a light absorbance of 1.5-10 at 300-340 nm, is applied on a substrate surface and polymerized.

18 Claims, 5 Drawing Sheets

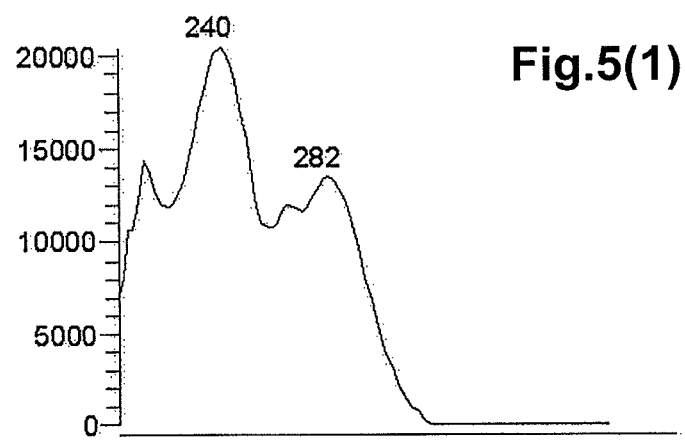
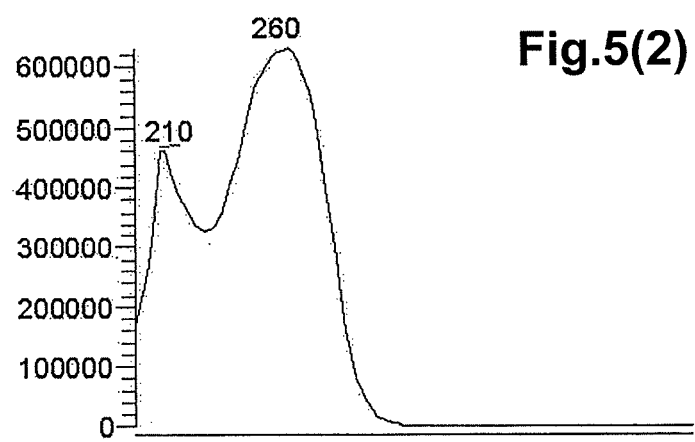
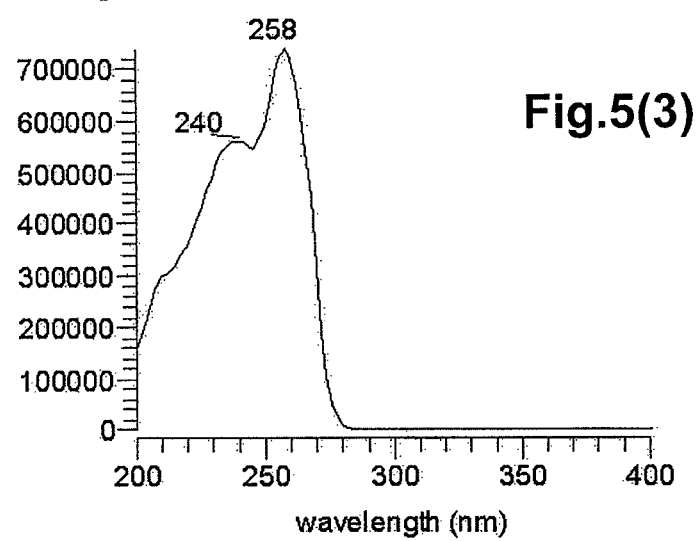

METHOD FOR PRODUCTION OF SOLID ELECTROLYTE AND SOLID ELECTROLYTIC CAPACITOR

CROSS-REFERENCE TO RELATED APPLICATION

This application was filed pursuant to 35 U.S.C. 111(a) with claiming the benefit of filing date of U.S. Provisional Application Ser. No. 60/752,920 filed Dec. 23, 2005 under the provision of 35 U.S.C. 111(b) pursuant to 35 U.S.C. 119(e)(1).

TECHNICAL FIELD

This invention relates to a method for producing a solid electrolyte comprised of an electrically conductive polymer, and a solid electrolyte capacitor provided with the solid electrolyte.

BACKGROUND ART

A basic element of a solid electrolyte capacitor generally has a structure as illustrated in FIG. 1 and is manufactured by a process comprising the steps of forming an oxide layer (2) comprised of a dielectric on an anode substrate (1) comprised of a metal foil which is etched and has an enhanced specific surface area; forming solid semiconductor layers (4) (the solid semiconductor layers are hereinafter called "solid electrolyte" when appropriate) as confronting electrodes on both outsides of dielectric layer (2); and, if desired, forming an electrically conductive layer (5) from, for example, an electrically conductive paste. The thus-manufactured basic element is connected singly to lead wires (6), (7), or a plurality of the thus-manufactured basic elements are laminated together, and the laminate is connected to lead wires (6), (7). Then the thus-obtained assembly is entirely encapsulated with, for example, an epoxy resin (8) to give a part for capacitor (9). The part for capacitor is used widely in electrical and electronic appliances and equipments.

To cope with the demands for digitization of electrical appliances and higher speed processing of personal computers in recent years, the capacitors used therefor are required to be compact, have a large capacitance and give a low impedance in a high frequency region. For these capacitors, a solid electrolyte comprised of a conductive polymer having an electro-conductivity has recently been proposed.

In general, as a procedure for forming an electrically conductive polymer film on a dielectric oxide layer, an electrolytic oxidative polymerization procedure or a chemical oxidative polymerization procedure are known. The chemical oxidative polymerization procedure is advantageous from an economical view point in that the electrically conductive polymer film can be formed easily and in a large amount for a short period of time, but has a problem in that the polymerization reaction and the form of polymer film are difficult to control. To solve this problem, various methods have been proposed.

As an example of the chemical oxidative polymerization procedure, a procedure has been proposed wherein a cycle comprising the steps of dipping a substrate in a polymerizable monomeric compound-containing solution and then dipping the substrate in an oxidizing agent-containing solution, is repeated (see patent document 1). It is known, however, that the repeat of cycle comprising dipping in a polymerizable monomeric compound-containing solution and dipping in an oxidizing agent-containing solution results in oxidative deterioration of the polymerizable monomeric compound due to undesirable falling or dissolution of a part of the applied oxidizing agent into the polymerizable monomeric compound-containing solution to be applied.

A proposal for refining the degraded polymerizable monomeric compound-containing solution for the reuse thereof has been made wherein impurities in the deteriorated polymerizable monomeric compound-containing solution are selectively adsorbed on a porous material to be thereby removed (see patent document 2). A further proposal for producing a solid electrolyte capacitor having an enhanced heat resistance has been made wherein an unreacted monomer and an unreacted oxidizing agent which remain in a capacitor element are removed (see patent document 3).

Patent document 1: JP 03187380 B1
Patent document 2: JP 2001-244151 A1
Patent document 3: JP 2004-95696 A1

DISCLOSURE OF THE INVENTION

Problems to Be Solved by the Invention

In general, a solid electrolyte capacitor having a predetermined capacity is manufactured by a method wherein a plurality of capacitor elements each having an electrically conductive polymer layer are superposed upon another, an anode lead wire is connected to an anode terminal of the superposed electrically conductive polymer layers, a cathode lead wire is connected to the superposed conductive polymer layers, and then the thus-formed assembly is encapsulated with an insulating resin such as an epoxy resin.

The thickness of the conductive polymer layers should be large enough for suppressing the current leakage of solid electrolyte capacitor. Unless the polymerization conditions are precisely controlled, the adhered conductive polymer layers for forming the cathode portions of the capacitor become uneven in thickness and, in thin portions of the adhered polymer layers, a conductive paste is often contacted directly with a dielectric oxide layer, leading to leakage of current.

However, in the case when the conductive polymer layers have a large thickness, the number of capacitor elements to be superposed to a chip is limited and thus a solid electrolyte capacitor chip having a large capacity is difficult to obtain. Further, when the adhered conductive polymer layers for forming the cathode portions of the capacitor are uneven in thickness, the effective contact area between the adjacent capacitor elements becomes small, which leads to undesirable enhancement in equivalent series resistance (ESR)

To reduce the unevenness in thickness of the conductive polymer layers, the polymerization conditions must be controlled precisely over a long polymerization time. However, the polymerization under such conditions remarkably reduces the productivity.

Means for Solving the Problems

Therefore, an object of the present invention is to solve the above-mentioned problems and to provide a method for producing a solid electrolyte whereby a dense polymer can be formed within a short polymerization time and from which a thin capacitor element having uniform form and dimension can be stably manufactured while avoiding an increase of short-circuit in the capacitor element.

Another object of the present invention is to provide a multilayer solid electrolyte capacitor having layers of the solid electrolyte produced by the above-mentioned method, and having a high capacity and exhibiting a reduced equivalent series resistance.

The present inventor made extensive research for achieving the above-mentioned object and found that the polymerization reaction proceeds at an enhanced rate and a uniform polymer film can be formed by a method for producing a solid electrolyte comprised of an electrically conductive polymer wherein a solution containing a compound having a thiophene skeletal structure or another five-membered heterocyclic compound as a polymerizable monomer is applied onto a substrate surface and the monomer is polymerized, characterized by using a solution containing the compound having a thiophene skeletal structure or another five-membered heterocyclic compound, and a small amount of a dimmer thereof and/or a trimer thereof.

The present inventor further found that the polymerization reaction proceeds at a further enhanced rate with a high efficiency by a method for producing a solid electrolyte comprised of an electroconductive polymer wherein a solution containing a compound having a thiophene skeletal structure as a polymerizable monomer is applied onto a substrate surface, and the applied polymerizable monomer is polymerized, characterized in that the solution containing the thiophene skeletal structure-having compound used exhibits a light absorbance falling in the specified range at a wavelength of 300-340 nm. The light absorbance occurring at a wavelength of 300-340 nm is due to the presence of a dimmer of the thiophene skeletal structure-having compound, and/or a trimer thereof. That is, the solution of the thiophene skeletal structure-having compound, exhibiting a light absorbance falling in the specified range at a wavelength of 300-340 nm, contains the thiophene skeletal structure-having compound, and a dimmer thereof and/or a trimer thereof. The presence of the dimer and/or the trimer enhances the rate of polymerization of the thiophene skeletal structure-having compound and contributes the formation of a uniform polymer film.

It has been further found that the above-mentioned methods give a solid electrolyte from which a thin solid electrolyte capacitor element having uniform form and dimension can be stably manufactured while avoiding an increase of short-circuit in the capacitor element; and the solid electrolyte capacitor element gives multilayer solid electrolyte capacitors having a high capacity provided that a plurality of the capacitor elements are superposed, and exhibiting a minimized unevenness in equivalent series resistance.

Based on the above-mentioned findings, the present invention has been completed.

Thus, in accordance with the present invention, there are provided the following methods for producing a solid electrolyte.

(1) A method for producing a solid electrolyte comprising the steps of:

applying a solution containing a five-membered heterocyclic compound as a polymerizable monomer onto a surface of a substrate, and polymerizing the applied polymerizable monomer to give a solid electrolyte comprised of an electrically conductive polymer, said method being characterized in that the polymerizable monomer-containing solution contains the polymerizable monomer and at least one polymerizable component selected from the group consisting of a dimer of the polymerizable monomer and a trimer of the polymerizable monomer, at a proportion satisfying the following equation:

$$A/(B+C)=100\text{-}1{,}000{,}000$$

where A: concentration of the polymerizable monomer,

B: concentration of the dimmer as expressed in terms of the concentration of the polymerizable monomer, and C: concentration of the trimer as expressed in terms of the concentration of the polymerizable monomer.

(2) The method for producing a solid electrolyte as described above in (1), wherein the five-membered heterocyclic compound as the polymerizable monomer is a monomeric compound selected from the group consisting of a compound having a thiophene skeletal structure, a compound having a pyrrole skeletal structure and a compound having a furan skeletal structure.

(3) The method for producing a solid electrolyte as described above in (1), wherein the five-membered heterocyclic compound as the polymerizable monomer is a compound having a thiophene skeletal structure.

(4) A method for producing a solid electrolyte comprising the steps of:

applying a solution containing a compound having a thiophene skeletal structure as a polymerizable monomer onto a surface of a substrate, and polymerizing the applied polymerizable monomer to give a solid electrolyte comprised of an electrically conductive polymer, said method being characterized in that the solution containing the compound having a thiophene skeletal structure as applied onto the substrate surface for polymerization has a light absorbance in the range of 1.5 to 10 at a wavelength of 300-340 nm.

(5) The method for producing a solid electrolyte as described above in (4), wherein the polymerizable monomer-containing solution contains the compound having a thiophene skeletal structure at a concentration in the range of 3 to 75% by mass.

(6) The method for producing a solid electrolyte as described above in (4), wherein the polymerizable monomer-containing solution contains the compound having a thiophene skeletal structure as the polymerizable monomer, and at least one polymerizable component selected from the group consisting of a dimer of the polymerizable monomer and a trimer of the polymerizable monomer, at a proportion satisfying the following equation:

$$A/(B+C)=100\text{-}1{,}000{,}000$$

where A: concentration of the polymerizable monomer,

B: concentration of the dimmer as expressed in terms of the concentration of its monomer, and C: concentration of the trimer as expressed in terms of the concentration of its monomer.

(7) The method for producing a solid electrolyte as described above in (1) or (4), wherein the polymerizable monomer-containing solution contains the polymerizable monomer and at least one polymerizable component selected from the group consisting of a dimer of the polymerizable monomer and a trimer of the polymerizable monomer, at a proportion satisfying the following equation:

$$A/(B+C)=100\text{-}250{,}000$$

where A: concentration of the polymerizable monomer,

B: concentration of the dimmer as expressed in terms of the concentration of the polymerizable monomer, and C: concentration of the trimer as expressed in terms of the concentration of the polymerizable monomer.

(8) The method for producing a solid electrolyte as described above in (1) or (4), wherein the substrate is comprised of a porous metal body having a valve action and a dielectric layer formed on a surface of the porous metal body.

(9) The method for producing a solid electrolyte as described above in (1) or (4), wherein the polymerization of the applied polymerizable monomer is carried out in the presence of an oxidizing agent.

(10) The method for producing a solid electrolyte as described above in (1) or (4), which comprises conducting at least one cycle comprising the steps of:

applying the polymerizable monomer-containing solution onto a dielectric layer formed on the surface of substrate, and then drying a thus-deposited coating of the applied polymerizable monomer-containing solution; and, applying a solution containing an oxidizing agent onto the dried coating of the polymerizable monomer-containing solution on the dielectric layer-formed surface of substrate, and then maintaining in an air atmosphere the substrate having the surface having applied thereto the oxidizing agent-containing solution to effect polymerization of the polymerizable monomer, followed by drying a coating containing a thus-formed polymer.

(11) The method for producing a solid electrolyte as described above in (1) or (4), wherein the produced solid electrolyte is comprised of an electrically conductive polymer having a polymerization degree in the range of 5 to 2,000.

In accordance with the present invention, there is further provided a solid electrolyte capacitor characterized as being provided with a solid electrolyte produced by the production method as described above in (1) or (4).

Effect of the Invention

According to the production method of the present invention, a thin solid electrolyte capacitor element having uniform shape and dimension can be stably manufactured while avoiding an increase of short-circuiting in the capacitor element.

The solid electrolyte formed on a dielectric film of a substrate for a solid electrolyte capacitor by the production method of the present invention exhibits a high adhesion to the dielectric film, has a large capacity and exhibits a reduced dielectric loss factor (tan δ), a reduced leakage current and a low fraction defective.

The thin solid capacitor element obtained from the solid electrolyte can give multilayer solid electrolyte capacitors having a high capacity provided that an increased number of the capacitor elements are superposed, and exhibiting a minimized unevenness in equivalent series resistance.

3(1): mass spectrum of a 3,4-ethylenedioxythiophene dimer with M$^+$H of 285.

3(2): mass spectrum of a 3,4-ethylenedioxythiophene dimer with M$^+$H of 283.

3(3): mass spectrum of a 3,4-ethylenedioxythiophene trimer with M$^+$H of 427.

3(4): mass spectrum of a 3,4-ethylenedioxythiophene trimer with M$^+$H of 425.

3(5): mass spectrum of 3,4-ethylenedioxythiophene trimer with M$^+$H of 423.

Figure 4:
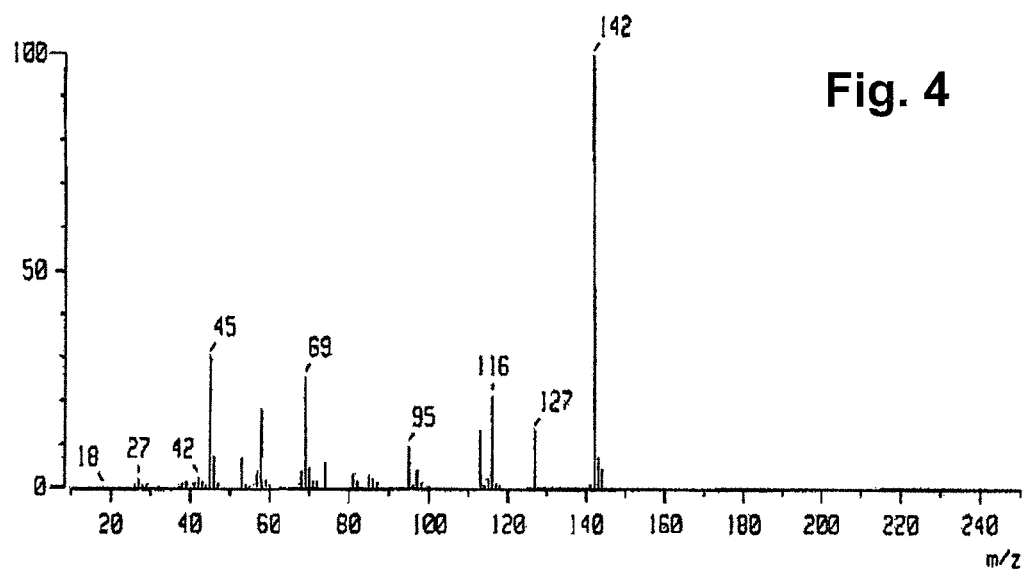

FIG. 4 illustrates a mass spectrum of a 3,4-ethylenedioxythiophene monomer.

FIG. 5 illustrates the following UV spectra.

5(1): UV spectrum of a mixture of 3,4-ethylenedioxythiophene trimers.

5(2): UV spectrum of a mixture of 3,4-ethylenedioxythiophene dimers.

5(3): UV spectrum of 3,4-ethylenedioxythiophene monomer.

Figure 6:
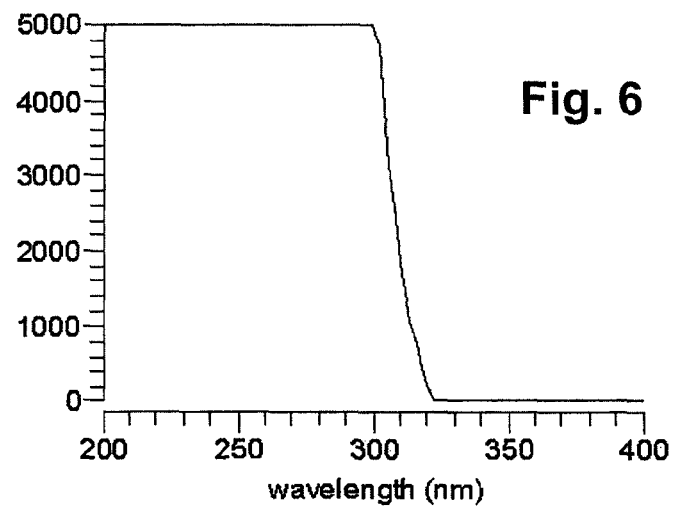

FIG. 6 illustrates an enlarged UV spectrum of a 3,4-ethylenedioxythiophene trimer mixture.

Figure 7:
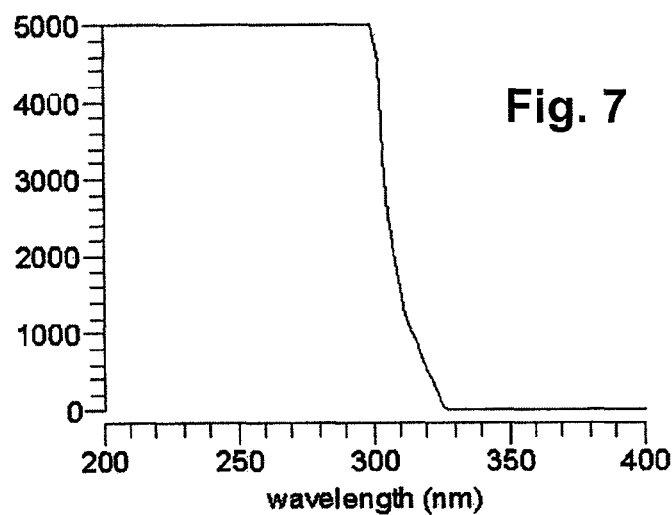

FIG. 7 illustrates an enlarged UV spectrum of a 3,4-ethylenedioxythiophene dimer mixture.

Figure 8:
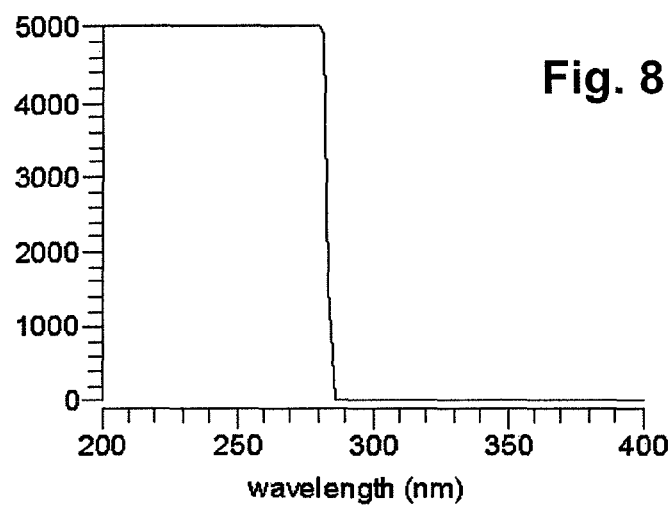

FIG. 8 illustrates an enlarged UV spectrum of a 3,4-ethylenedioxythiophene monomer.

EXPLANATION OF REFERENCE NUMERALS

| | |
|---|---|
| 1 | Anode substrate |
| 2 | Dielectric (oxide film) layer |
| 3 | Masking |
| 4 | Semiconductor (solid electrolyte) layer |
| 5 | Electroconductive layer |
| 6, 7 | Lead wire |
| 8 | Encapsulating resin |
| 9 | Solid electrolyte capacitor |

BEST MODE FOR CARRYING OUT THE INVENTION

The method of the present invention will now be described with reference to the accompanying drawings.

Figure 1:
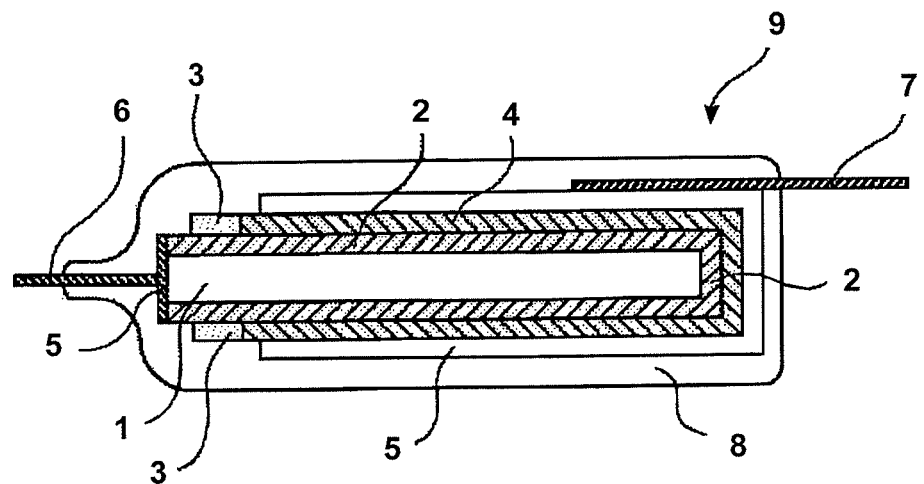
FIG. 1 is a cross-sectional view of an example of a solid electrolyte capacitor provided with a capacitor element.

In the basic element of a solid electrolyte capacitor as illustrated in FIG. 1, the dielectric layer (2) on a surface of the anode substrate (1) is formed usually by chemically treating a porous shaped article comprised of a metal having a valve action.

The metal having a valve action which can be used in the present invention includes single metals such as aluminum, tantalum, niobium, titanium, zirconium and silicon, or alloys of these metals. The shape of the metal having a valve action is not particularly limited, and the metal is selected from, for example, porous materials such as a sintered body of fine metal powder, and an etched product of a rolled metal foil.

The anode substrate (1) includes, for example, porous sintered bodies comprised of the above-mentioned metal, and sheets, ribbons and foils, and wires, which have a surface roughened or rendered porous by, for example, etching. Preferably the anode substrate is made of a sheet or a foil.

The formation of the dielectric oxide layer or film on the anode substrate can be carried out by the publicly known procedures. For example, in the case when a sintered body of tantalum powder is used, the sintered body is subjected to anodic oxidation in an aqueous phosphoric acid solution thereby to form a dielectric oxide layer or film on the surface of the sintered body.

The thickness of a foil of metal with a valve action varies depending upon the particular use thereof, but the thickness can preferably be in the range of approximately 40 to approximately 300 μm. For example, for a thin solid electrolyte capacitor, an aluminum foil having a thickness in the range of 80 to 250 μm is used to give an element with a solid electrolyte capacitor having a thickness of 250 μm or smaller.

The size and shape of the metal foil varies depending upon the use, but the metal foil is preferably cut into a flat-sheet type element unit having a square or rectangular shape with a width of approximately 1 mm to approximately 50 mm and a length of approximately mm 1 to approximately 50 mm. More preferably, the metal foil is cut into a square or rectangular shape with a width of approximately 2 mm to approximately 15 mm and a length of approximately 2 mm to approximately 25 mm.

Chemical forming conditions such as chemical forming voltage and kinds of chemical forming solution are appropriately chosen depending upon the particular capacitance required for a capacitor and the dielectric strength, by a preliminary test.

In general, masking (3) is applied when the chemical formation is carried out, for the purpose of preventing the chemical forming solution from migrating up to a portion of the solid electrolyte capacitor to be formed into an anode thereof, and ensuring the insulation against a solid electrolyte (4) (i.e., a cathode portion of the capacitor) to be formed later.

A masking material used is not particularly limited, and includes, for example, a general heat-resistant resin, preferably soluble in or swollen with a solvent, and a precursor thereof, and a composition comprising an inorganic fine powder and a cellulosic resin. As specific examples of the masking material, there can be mentioned polyphenylsulfone (PPS), polyethersulfone (PES), a cyanic acid ester resin, fluoro-resins such as polytetrafluoroethylene and a teterafluoroethylene-perfluoroalkylvinylether copolymer, and low-molecular-weight polyimide and a derivative thereof, and precursors thereof. Of these, low-molecular-weight polyimide, polyethersulfone (PES), fluoro-resins, and their precursors are especially preferable In the production method according to the present invention, after the formation of the dielectric layer on the porous substrate comprised of a metal having a valve action, a polymerizable monomer-containing solution is applied onto a surface of the dielectric layer, followed by polymerization of the monomer. The polymerization is preferably carried out in the presence of an oxidizing agent.

More specifically, a cycle comprising the following combinations of steps is carried out at least once. A first combination of a step of applying a liquid containing an oxidizing agent onto the surface of dielectric layer-formed substrate by a procedure of, for example, dipping the substrate in the oxidizing agent-containing liquid, or spraying or atomizing the oxidizing agent-containing liquid onto the substrate surface; and a step of preferably drying the thus-formed coating of the oxidizing agent-containing liquid in the air. A second combination including a step of applying a polymerizable monomer-containing solution onto a surface of the oxidizing agent-applied substrate by a procedure of, for example, dipping the oxidizing agent-applied substrate in the monomer-containing solution, or spraying or atomizing the monomer-containing solution onto a surface of the oxidizing agent-applied substrate. A third combination of a step of maintaining the monomer-containing solution-applied substrate in the air whereby the monomer is polymerized; and a final step of drying a thus-formed polymer solution.

In the above-mentioned oxidative polymerization procedure, the polymerization is carried, if desired, in the presence of a dopant for a resulting electrically conductive polymer.

Thus, an electrically conductive polymer composition as a solid electrolyte is formed on the dielectric layer-formed porous substrate comprised of a metal having a valve action.

By the term "monomer" as used in the present invention, we mean a raw material compound which is a smallest repeating unit for forming a structure constituting the electrically conductive polymer produced by polymerization. The term "dimer" refers to a raw material compound comprised of two of the smallest repeating unit for forming a structure constituting the electrically conductive polymer. The term "trimer" refers to a raw material compound comprised of three of the smallest repeating unit for forming a structure constituting the electrically conductive polymer.

The production method of the present invention is characterized as using a polymerizable monomer-containing solution containing a five-membered heterocyclic compound as the polymerizable monomer and a small amount of a dimer of the monomer and/or a trimer of the monomer. By using the polymerizable monomer-containing solution containing a small amount of a dimer of the monomer and/or a trimer of the monomer, the oxidative polymerization can be proceeded at a relatively uniform rate to give a dense and uniform polymer film. The dimmer and the trimer which are used in a small amount exhibit a low oxidation potential and hence are easily polymerized in the presence of an oxidizing agent, and thus, function as a reaction activating species and accelerate the polymerization of the monomer.

The solution containing a five-membered heterocyclic compound as the polymerizable monomer further contains at least one polymerizable component selected from the group consisting of a dimer of the monomer and a trimer of the monomer, at a proportion satisfying the following equation:

$$A/(B+C)=100\text{-}1{,}000{,}000$$

where A: concentration of the polymerizable monomer,
B: concentration of the dimmer as expressed in terms of the concentration of the monomer, and
C: concentration of the trimer as expressed in terms of the concentration of the monomer.

The dimmer and/or the trimer accelerate the polymerization reaction and thus a uniform polymer film can be formed by repeating the cycle of application of an oxidizing agent and application of a monomer solution at fewer times than in the case when a monomer solution not containing the dimmer nor the trimer is used. If the amount of the dimmer and/or the trimer is too small and the above-mentioned ratio of A/(B+C) is larger than 1,000,000, the polymerization rate-enhancing effect cannot be obtained. In contrast, if the amount of the dimmer and/or the trimer is too large and the above-mentioned ratio of A/(B+C) is smaller than 100, the polymerization rate is too high and difficult to control, and thus a dense polymer film becomes difficult to obtain.

The monomer concentration ratio of A/(B+C) is preferably in the range of 100 to 250,000 and more preferably 100 to 100,000.

The monomer-containing solution as used in the present invention can be prepared by mixing together a solution containing a five-membered heterocyclic compound with a separately prepared solution of the dimmer and/or the trimer. Alternatively, in the course of repeating a cycle of applying a solution containing a five-membered heterocyclic compound as a polymerizable monomer and applying a solution of an oxidizing agent, by dipping or atomizing or spraying, the concentration of the dimmer and/or the trimer produced in a coating formed by applying the five-membered heterocyclic compound-containing solution is adjusted so as to satisfy the above-mentioned ratio of A/(B+C).

The dimmer and trimer of the five-membered heterocyclic compound such as a compound having a thiophene skeletal structure can be identified, for example, by observing protonated molecular ion peaks ($M^+ + H$) in gas chromatography/mass spectrometry (hereinafter abbreviated to "GC/MS").

The concentrations of the dimmer and trimer of the monomer as expressed in terms of the concentration of the monomer in the present invention can be measured by gel permeation chromatography (hereinafter abbreviated to "GPC"). More specifically said concentration of the dimmer and trimer can be determined by an area normalization method wherein the total area of peaks attributed to the specified dimmer and the specified trimer as observed by GC/MS spectrum is measured, and the concentrations of the dimmer and trimer as expressed in terms of the concentration of the monomer are calculated from the total area of the peaks and the peak area of the monomer as observed by GPC on a monomer solution with a predetermined concentration.

Among the five-membered heterocyclic compounds as an electroconductive polymer-forming monomer, a compound having a thiophene skeletal structure is especially preferably used.

In another aspect of the present invention, there is provided a method for producing a solid electrolyte comprising the steps of applying a solution containing a compound having a thiophene skeletal structure as a polymerizable monomer onto a surface of a substrate, and polymerizing the applied polymerizable monomer to give a solid electrolyte, said method being characterized in that the solution containing the compound having a thiophene skeletal structure as applied onto the substrate surface for polymerization has a light absorbance in the range of 1.5 to 10 at a wavelength of 300 nm to 340 nm.

That is, the present inventor has found that, in the case when the solution containing the compound having a thiophene skeletal structure as applied onto the substrate surface for polymerization has a light absorbance in the range of 1.5 to 10 at a wavelength of 300 nm to 340 nm, substantially the same beneficial effect of polymerization acceleration is achieved as in the case when the above-mentioned solution containing the polymerizable monomer and at least one polymerizable component selected from the dimer and the trimer at the specific proportion.

The solution of the compound with a thiophene skeletal structure having the above-specified light absorbance is a solution containing the monomer and minor amounts of dimmer and/or trimer, and optionally minor amounts of tetramer or higher oligomers. A solution comprised of the monomer and minor amount of the dimer and/or trimer is preferable.

In the case when the solution of the compound with a thiophene skeletal structure having a light absorbance in the range of 1.5 to 10 at a wavelength of 300 nm to 340 nm is used, the concentration of the compound with a thiophene skeletal structure as the monomer in the solution can be appropriately chosen in the range of 3% to 75% by mass. Said concentration of the monomer is preferably in the range of 10% to 60% by mass, more preferably 15% to 45% by mass and especially preferably 20% to 35% by mass. That is, when a solution containing the compound with a thiophene skeletal structure at a concentration of 20% to 35% by mass and having a light absorbance in the range of 1.5 to 10 at a wavelength of 300-340 nm is used, the effect of polymerization acceleration is most markedly manifested, and thus, a uniform polymer film can be formed on a metal substrate having a valve action at a reduced number of cycles for applying the monomer-containing solution and applying an oxidizing agent-containing liquid, to a metal substrate having a valve action.

A monomer solution containing the compound having a thiophene skeletal structure used in the present invention generally do not exhibit light absorbance at a wavelength of at least 300 nm, but, when the monomer solution contains small amounts of a dimmer, a trimer or higher oligomers, in addition to the monomer, the solution exhibits a light absorbance at a wavelength of 300 nm to 340 nm. In other words, the light absorbance at a wavelength of 300 nm to 340 nm corresponds to a total amount of a dimer, a trimer and a higher oligomer at the specified wavelength.

Especially beneficial effects can be obtained in the case when the polymerizable monomer-containing solution contains the compound having a thiophene skeletal structure as the polymerizable monomer, and at least one polymerizable component selected from the group consisting of a dimer of the polymerizable monomer and a trimer of the polymerizable monomer, at a proportion satisfying the following equation:

$$A/(B+C)=100\text{-}1{,}000{,}000$$

where A: concentration of the polymerizable monomer,
B: concentration of the dimmer as expressed in terms of the concentration of its monomer, and
C: concentration of the trimer as expressed in terms of the concentration of its monomer.

The proportion of the monomer, and the dimmer/trimer is more preferably in the range of 100 to 250,000 and most preferably 100 to 100,000.

Polymerization of the polymerizable monomer is carried out by the steps of applying the polymerizable monomer-containing solution onto a surface of a substrate with a valve action by, for example, dipping the substrate in the monomer solution or spraying or atomizing the monomer solution on the substrate, and thereafter applying a solution containing an oxidizing agent onto a coating of the monomer-containing solution on the substrate surface, and then maintaining in an air atmosphere the substrate having the surface having deposited thereto the oxidizing agent-containing solution to effect polymerization of the monomer, followed by drying a coating containing a thus-formed polymer.

The temperature at which the substrate is maintained in an air atmosphere varies depending upon the particular kind of monomer. For example, when a monomeric compound having a pyrrole skeletal structure is used, a temperature not higher than 5° C. is preferable. When a monomeric compound having a thiophene skeletal structure is used, a temperature in the range of approximately 30° C. to approximately 60° C. is preferable.

The polymerization time varies depending upon the particular amount of the monomer deposited by dipping, or spraying or atomizing. The amount of the deposited monomer varies depending upon the concentration and viscosity of the monomer-containing solution, and other conditions. In general, when the amount of monomer deposited in each cycle comprising the above steps is small, the polymerization time can be shortened. In contrast, when the amount of monomer deposited in each cycle is large, the polymerization time should be long. In the method of the present invention, the polymerization time in each cycle is usually in the range of 10 seconds to 30 minutes, preferably 3 minutes to 15 minutes.

The solid electrolyte comprised of an electrically conductive polymer, obtained by the method of the present invention, preferably has a fibril structure or a lamellar structure (thin film layer). In this structure, polymer chains are superposed upon each other over a broad range thereof. In the production method of the present invention, a minor part of solvent in the oxidizing agent-containing solution remains preferably unreacted, and therefore a polymer layer and a polymer layer formed thereon are partly adhered together. Thus interlaminar adhesion in the multilayer structure is enhanced with the results that electron hopping between polymer chains easily occurs and electrical conductivity is enhanced, and low impedance and other beneficial properties are obtained.

The steps in the method for forming a solid electrolyte layer on a dielectric layer formed on the surface of porous substrate comprised of a metal having a valve action according to the present invention will be described in turn.

The step of applying a polymerizable monomer-containing solution to the dielectric layer on the porous metal substrate having a valve action by dipping the dielectric layer-formed substrate in the monomer-containing solution, or by spraying or atomizing the monomer-containing solution on the dielectric layer-formed substrate (which step is hereinafter referred to as "step (1)" when appropriate) is conducted for supplying the polymerizable monomer onto the dielectric layer-formed substrate or onto a polymer composition layer as formed by polymerization.

A coating of the monomer-containing solution, thus-formed by dipping or spraying or atomizing on the dielectric layer-formed substrate or on the polymer composition layer as formed by polymerization is left to stand in the air for a predetermined time whereby the solvent is volatilized. This volatilization of solvent is conducted so that the polymerizable monomer is deposited at a uniform thickness on the dielectric layer-formed substrate or on the polymer composition layer. The conditions under which the volatilization is conducted vary depending upon the particular kind of solvent, but the volatilization temperature is in the range of approximately 0° C. to the boiling point of solvent.

The time for which the coating of the monomer-containing solution is left to stand in the air vary depending upon the particular kind of solvent, but is in the range of approximately 5 seconds to 15 minutes. For example, in the case when the solvent is an alcohol, the leaving time can be 5 minutes or shorter.

By leaving the coating of the monomer-containing solution to stand for the above-mentioned period of time, the deposition of the polymerizable monomer onto the dielectric layer-formed substrate or onto the polymer composition layer can be uniform, and the contamination occurring at dipping in an oxidizing agent-containing solution or spraying or atomizing an oxidizing agent-containing solution in the succeeding step can be minimized.

The supply of the monomer-containing solution can be controlled by, for example, the kind of solvent used in the monomer-containing solution, the concentration of the monomer-containing solution, the temperature of the monomer-containing solution, and the dipping time.

The dipping time adopted in the step (1) in the method of the present invention should be sufficient for the deposition of the polymerizable monomer in the monomer-containing solution onto the dielectric layer-formed substrate, and the dipping time is shorter than 15 minutes. The dipping time is preferably chosen in the range of 0.1 second to 10 minutes, and more preferably 1 second to 7 minutes.

The dipping temperature is preferably in the range of −10° C. to 60° C., and more preferably 0° C. to 40° C. If the dipping temperature is lower than −10° C., the volatilization time of the solvent is long and the reaction time becomes undesirably long. In contrast, if the dipping temperature exceeds 60° C., volatilization of the solvent and the monomer occurs not to a negligible extent, and the concentration of the monomer-containing solution becomes difficult to control.

The concentration of the monomer-containing solution is not particularly limited, and may be optionally chosen. In view of good permeability of the monomer-containing solution into the porous metal substrate having a valve action, the concentration of the monomer-containing solution is preferably in the range of 3% to 75% by mass, more preferably 10% to 60% by mass, especially preferably 15% to 45% by mass, and most preferably 20% to 35% by mass.

As specific examples of the solvent in the monomer-containing solution used in the step (1) in the method of the invention, there can be mentioned ethers such as tetrahydrofuran (THF), dioxane and diethyl ether; ketones such as acetone and methyl ethyl ketone; aprotic polar solvents such as dimethylformamide, acetonitrile, benzonitrile, N-methylpyrrolidone (NMP) and dimethylsulfoxide (DMSO); esters such as ethyl acetate and butyl acetate; non-aromatic chlorine-containing solvents such as chloroform and methylene chloride; nitro compounds such as nitromethane, nitroethane and nitrobenzene; alcohols such as methanol, ethanol and propanol; and water. These solvents may be used alone or as mixed solvents. Preferable solvents are alcohols, ketones and these mixed solvents.

In the step of applying an oxidizing agent-containing solution to the dielectric layer-formed metal substrate having a valve action by, for example, dipping the dielectric layer-formed metal substrate in the oxidizing agent-containing solution (which step is hereinafter referred to as "step (2)" when appropriate), the dipping time should be sufficient for the deposition of the oxidizing agent onto the dielectric layer-formed metal substrate, and the dipping time is shorter than 15 minutes. The dipping time is preferably chosen in the range of 0.1 second to 10 minutes, and more preferably 1 second to 7 minutes.

The oxidizing agent used in the step (2) includes those which are used as an aqueous solution and those which are used as a solution in an organic solvent. As specific examples of the oxidizing agent used as an aqueous solution, there can be mentioned peroxodisulfuric acid, and its sodium salt, potassium salt and ammonium salt; cerium(IV) nitrate, ceric (IV) ammonium nitrate, iron(III) sulfate, iron(III) nitrate and iron(III) chloride. As specific examples of the oxidizing agent used as a solution in an organic solvent, there can be mentioned iron(III) salts of organic sulfonic acids such as iron(III) dodecylbenzenesulfonate and iron(III) p-toluenesulfonate.

As specific examples of the solvent in the oxidizing agent-containing solution used in the step (2) in the method of the invention, there can be mentioned ethers such as tetrahydrofuran (THF), dioxane and diethyl ether; ketones such as acetone and methyl ethyl ketone; aprotic polar solvents such as dimethylformamide, acetonitrile, benzonitrile, N-methylpyrrolidone (NMP) and dimethylsulfoxide (DMSO); alcohols such as methanol, ethanol and propanol; and water. These solvents may be used either alone or as mixed solvents. Preferable solvents are alcohols, ketones and these mixed solvents.

The concentration of the oxidizing agent-containing solution is preferably in the range of 5% to 50% by mass, and the temperature of the oxidizing agent-containing solution is preferably in the range of −15° C. to 60° C.

The viscosity of the oxidizing agent-containing solution is not larger than 100 centi-poise (cP), and preferably in the range of 0.6 cP to 50 cP.

The interlaminar distance between the adjacent polymer layers in the multilayer structure of the solid electrolyte is preferably in the range of 0.01 μm to 5 μm, and more preferably 0.1 μm to 1 μm.

The times of application of the monomer-containing solution and application of the oxidizing agent-containing solution are preferably chosen so that the resulting electrically conductive polymer composition has a thickness sufficiently resisting humidity, heat, stress and others.

In the method for producing a solid electrolyte according to the present invention, it is preferable that a cycle comprising the above-mentioned steps (1) and (2) is repeated. That is, a desired solid electrolyte can be produced by repeating a cycle comprising the steps (1) and (2) preferably at least 3 times, and more preferably 8 to 30 times, for each anode substrate.

In a preferred specific embodiment of the present invention, as described in the examples shown below, a dielectric layer-formed aluminum foil is dipped in, for example, a solution of 3,4-ethylenedioxythiophene (EDT) in isopropyl alcohol (IPA), and then the dipped dielectric layer-formed aluminum foil is taken and dried in the air to remove a predominant part of IPA. Thereafter the dielectric layer-formed aluminum foil is dipped in, for example, an aqueous oxidizing agent (ammonium persulfate) solution having a concentration of approximately 20% by mass, and then the oxidizing agent-coated dielectric layer-formed aluminum foil is taken and dried by heating at a temperature of approximately 40° C. for 10 minutes. Preferably, a cycle of the dipping in EDT followed by drying, and the dipping in an aqueous oxidizing agent followed by heating is repeated. Thus, a polymer composition comprising poly-3,4-ethylenedioxythiophene can be produced.

The monomer used for producing a solid electrolyte by the production method according to the present invention is a five-membered heterocyclic compound, which has a π-electron conjugated structure. The solid electrolyte is an electrically conductive polymer having a polymerization degree preferably in the range of 5 to 2,000, more preferably 5 to 1,000 and especially preferably 5 to 200.

The five-membered heterocyclic compound used in the present invention is not particularly limited, and include, for example, a compound having a thiophene skeletal structure, a compound having a pyrrole skeletal structure and a compound having a furan skeletal structure.

As specific examples of the compound having a thiophene skeletal structure, there can be mentioned 3-methylthiophene, 3-ethylthiophene, 3-propylthiophene, 3-butylthiophene, 3-pentylthiophene, 3-hexylthiophene, 3-heptylthiophene, 3-octylthiophene, 3-nonylthiophene, 3-decylthiophene, 3-fluorothiophene, 3-chlorothiophene, 3-bromothiophene, 3-cyanothiophene, 3,4-dimethylthiophene, 3,4-diethylthiophene, 3,4-butylenethiophene, 3,4-methylenedioxythiophene and 3,4-ethylenedioxythiophene. These compounds having a thiophene skeletal structure are commercially available and can be prepared by known methods (for example, a method described in Synthetic Metals, 1986, vol. 15, p 169). The compound having a thiophene skeletal structure is not limited thereto.

As specific examples of the compound having a pyrrole skeletal structure, there can be mentioned 3-methylpyrrole, 3-ethylpyrrole, 3-propylpyrrole, 3-butylpyrrole, 3-pentylpyrrole, 3-hexylpyrrole, 3-heptylpyrrole, 3-octylpyrrole, 3-nonylpyrrole, 3-decylpyrrole, 3-fluoropyrrole, 3-chloropyrrole, 3-bromopyrrole, 3-cyanopyrrole, 3,4-dimethylpyrrole, 3,4-diethylpyrrole, 3,4-butylenepyrrole, 3,4-methylenedioxypyrrole and 3,4-ethylenedioxypyrrole. These compounds having a pyrrole structure are commercially available and can be prepared by known methods. The compound having a pyrrole skeletal structure is not limited thereto.

As specific examples of a compounds having a furan skeletal structure, there can be mentioned 3-methylfuran, 3-ethylfuran, 3-propylfuran, 3-butylfuran, 3-pentylfuran, 3-hexylfuran, 3-heptylfuran, 3-octylfuran, 3-nonylfuran, 3-decylfuran, 3-fluorofuran, 3-chlorofuran, 3-bromofuran, 3-cyanofuran, 3,4-dimethylfuran, 3,4-diethylfuran, 3,4-butylenefuran, 3,4-methylenedioxyfuran and 3,4-ethylenedioxyfuran. These compounds having a furan skeletal structure are commercially available and can be prepared by known methods. The compound having a furan skeletal structure is not limited thereto.

Of these, compounds having a thiophene skeletal structure is preferable. 3,4-Ethylenedioxythiphene (EDT) is especially preferable.

The procedures and conditions for polymerization of the above-recited compounds are not particularly limited, and appropriate procedures and conditions can easily be determined by conducting a preliminary test.

A solid electrolyte may be copolymers produced by copolymerization of at least two compounds selected from the above-recited compounds. The ratio of the monomers for copolymerization varies depending upon the particular polymerization conditions and other factors. Preferable ratio of the monomers, and polymerization conditions can be determined by a preliminary test.

For example, a method described in Japanese patent 3040113 and U.S. Pat. No. 6,229,689 can be adopted wherein an EDT monomer, preferably a solution form, and an oxidizing agent, preferably a solution form, are separately and sequentially, or simultaneously coated on a dielectric layer-formed metal foil having a valve action.

3,4-Ethylenedioxythiophene (EDT) preferably used in the present invention is easily dissolved in a monohydric alcohol such as isopropyl alcohol. However, EDT has poor hydrophilicity, therefore, when EDT is brought in contact with an aqueous oxidizing agent solution with a high concentration, polymerization of EDT proceeds at an enhanced rate at a boundary between the EDT and the oxidizing agent solution, whereby a conductive high-polymer solid electrolyte layer having a fibril structure or a lamella structure (thin laminar structure) is formed.

The solid electrolyte as formed by polymerization in the production method of the present invention is washed with a solvent. The solvent used for washing includes, for example, ethers such as tetrahydrofuran (THF), dioxane and diethyl ether; ketones such as acetone and methyl ethyl ketone; aprotic polar solvents such as dimethylformamide, acetonitrile, benzonitrile, N-methylpyrrolidone (NMP) and dimethylsulfoxide (DMSO); esters such as ethyl acetate and butyl acetate; non-aromatic chlorine-containing solvents such as chloroform and methylene chloride; nitro compounds such as nitromethane, nitroethane and nitrobenzene; alcohols such as methanol, ethanol and propanol; organic acids such as formic acid, acetic acid and propionic acid; anhydrides of these organic acids (for example, acetic anhydride); and water. These solvents may be used either alone or as a mixed solvent comprised of at least two thereof. Of these, water, alcohols and ketones, and mixed solvents thereof are preferably used.

The thus-produced solid electrolyte usually has an electrical conductivity in the range of approximately 0.1 to 200 S/cm, preferably approximately 1 to 150 S/cm and more preferably approximately 10 to 100 S/cm.

An electrically conductive layer is preferably formed on the thus-formed electrically conductive solid electrolyte layer to ensure good electrical contact with a cathode lead terminal. The formation of the electrically conductive layer is conducted by, for example, coating with an electrically conductive paste and solidification thereof, plating, metal deposition, or formation of an electrically conductive resin thin film.

After the formation of the electrically conductive layer, the electrically conductive solid electrolyte layer can be compressed. For example, when the electrically conductive layer contains an elastomer, the electrically conductive solid electrolyte layer can be advantageously compressed whereby the solid electrolyte layer can be subject to plastic deformation and rendered thinner, and the surface of the electrically conductive layer can be rendered smooth.

The thus-obtained solid electrolyte is usually connected with a lead terminal, and then is provided with an outer casing such as a resin molding, a resin casing or a metal casing, or an resin encapsulation formed by resin dipping. Thus capacitors used in various fields are obtained.

EXAMPLES

The present invention will be described specifically and in detail by the following working examples, which are illustrative of typical examples and do not limit the scope of the invention.

In the working examples, GPC/MS spectrum analysis was carried out by using a liquid chromatography (hereinafter abbreviated to "LC" when appropriate) apparatus provided with an autosampler (1100 series available from Agilent Technologies) and columns "Shodex GPC K-802 and KF802" available from Showa Denko K.K., and MS apparatus "LCQ Advantage" available from Thermoquest Corporation. In the MS spectrum analysis, ionization was conducted by the atmospheric pressure chemical ionization method.

In the working examples, conductive polymer solid electrolytes were produced from 3,4-ethylenedioxythiophene (EDT) as a polymerizable monomer.

A dimer of 3,4-ethylenedioxythiophene as used in the working examples refers to compounds exhibiting a proton-added molecule ion peak ($M^++H$) at 283 and 285 in the gas chromatography/mass (hereinafter abbreviated to "GC/MS" when appropriate) spectrum analysis. The sum of such compounds was referred to as the dimer in the working examples.

A trimer of 3,4-ethylenedioxythiophene as used in the working examples refers to compounds exhibiting a proton-added molecule ion peak ($M^++H$) at 423, 425 and 427 in the GC/MS spectrum analysis. The sum of such compounds was referred to as the trimer in the working examples.

In the method of the present invention, the concentration of the dimmer as expressed in terms of the concentration of the monomer, and the concentration of the trimer as expressed in terms of the concentration of the monomer can be determined by measurement according to gel permeation chromatography (hereinafter abbreviated to "GPC"). That is, the concentrations of the dimer and the trimer can be calculated from the sum of a simple area of peak attributed to the dimer and a simple area attributed to the trimer. The concentrations of the dimer and the trimer are calculated respectively from the ratio of simple area of peak attributed to the dimer and the ratio of simple area of peak attributed to the trimer, to the simple area of peak attributed to the monomer, the concentration of which is already known.

Figure 3:
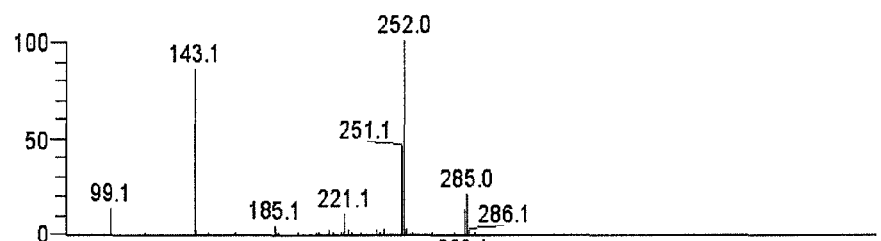
FIG. 3 illustrates the following mass spectra.
Figure 3:
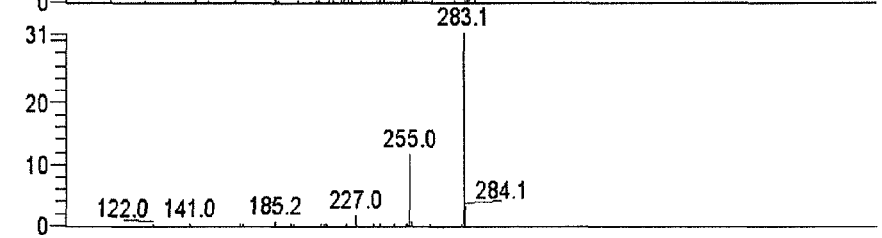
Figure 3:
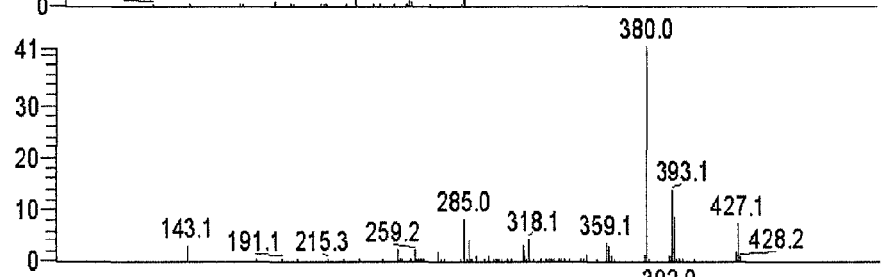
Figure 3:
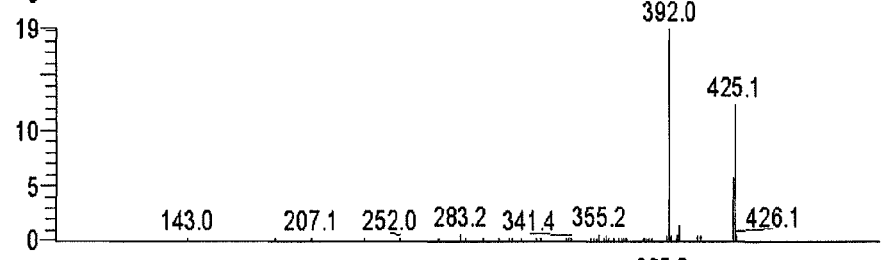
Figure 3:
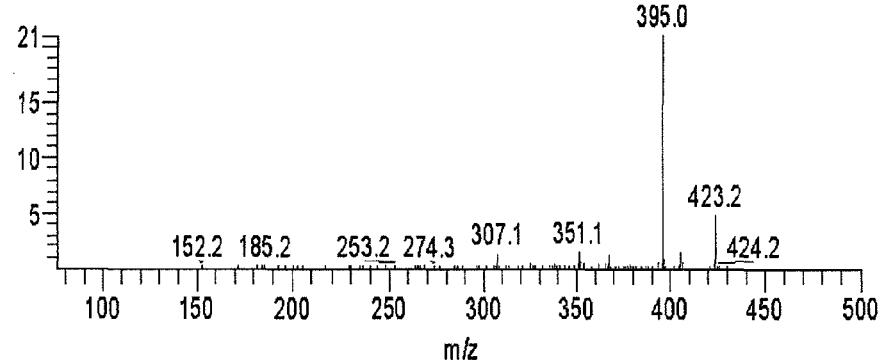

FIG. 3 illustrates mass spectra of the dimer and the trimer. That is, FIG. 3(1) and FIG. 3(2) illustrate mass spectra of molecule ion peaks of 3,4-ethylenedioxythiophene dimmers at 284 and 283 as detected by peaks of proton-added dimmers (hereinafter abbreviated to "M⁺H" when appropriate) at 285 and 284, respectively. FIG. 3(3), FIG. 3(4) and FIG. 3(5) illustrate mass spectra of molecule ion peaks of 3,4-ethylenedioxythiophene trimers at 426, 424 and 422 as detected by peaks of $M^+H$ at 427, 425 and 423, respectively. FIG. 4 illustrates MS spectrum of 3,4-ethylenedioxythiophene monomer as measured by electron impact mass spectrometry.

In the present invention, UV spectrum analysis was conducted using liquid chromatograph "LC-10A" available from Shimadzu Corporation; a combination of "Shodex GPC K-802" with "Shodex GPC KF-802" available from Showa Denko K.K. as chromatographic column; tetrahydrofuran as an eluant; and a photo diode array detector "DAD "G1315B" available from Agilent Technologies. The concentrations of the dimer and the trimer can be calculated from the sum of a simple area of peak attributed to the dimer and a simple area attributed to the trimer. The concentrations of the dimer and the trimer are determined by measurement according to GPC, which are calculated from the ratio of simple area of peaks attributed to the dimer and the ratio of simple area of peaks attributed to the trimer, to the simple area of peaks attributed to the monomer.

UV/visible light spectrum (hereinafter abbreviated to "UV spectrum when appropriate) of a mixture of 3,4-ethylenedioxythiophene trimers with molecule ion peaks at 422, 424 and 426 was illustrated in FIG. 5(1); UV spectrum of a mixture of 3,4-ethylenedioxythiophene dimers with molecule ion peaks at 282 and 284 was illustrated in FIG. 5(2); and UV spectrum of 3,4-ethylenedioxythiophene monomer was illustrated in FIG. (3).

An enlarged view of a part around 300 nm of the UV spectrum of a 3,4-ethylenedioxythiophene trimer mixture was illustrated in FIG. 6; an enlarged view of a part around 300 nm of the UV spectrum of a 3,4-ethylenedioxythiophene dimer mixture was illustrated in FIG. 7; and an enlarged view of a part around 300 nm of the UV spectrum of a 3,4-ethylenedioxythiophene monomer was illustrated in FIG. 8.

Example 1

A chemically formed aluminum foil with a thickness of 100 μm was cut into strips each with a width of 3 mm and a length of 10 mm. Each strip was coated with a polyimide solution so that a linear coating of the polyimide solution with a width of 1 mm was formed which belted the strip at a position 4 mm apart from one end thereof and 5 mm apart from the other end thereof (thus, each strip was divided into two parts, one of which had a 3 mm×4 mm size and the other had a 3 mm×5 mm). The linear polyimide coating was dried to form a linear masking belting each strip. One part having a 3 mm×4 mm size of each aluminum foil strip was subjected to chemical formation using an aqueous ammonium adipate solution with a concentration of 10% by mass while a voltage of 4V was applied, whereby a dielectric oxide layer was formed on the cut periphery of the part having a 3 mm×4 mm size.

Oxidative polymerization of 3,4-ethylenedioxythiophene was carried out to form a solid electrolyte film on said part having a 3 mm×4 mm size by the following procedures. Said part of strip was dipped in a solution in isopropyl alcohol (IPA) containing 25% by mass of 3,4-ethylenedioxythiophene, and 0.005% by mass, as expressed in terms of the concentration of 3,4-ethylenedioxythiophene monomer, of 3,4-ethylenedioxythiophene dimer for 5 seconds. Thus, the value as defined by the formula "A/(B+C)" (where A: concentration of the monomer, B: concentration of the dimmer as expressed in terms of the concentration of the monomer, and C: concentration of the trimer as expressed in terms of the concentration of the monomer) was 5,000. The dipped strip was dried at room temperature for 5 minutes, and then dipped in an aqueous ammonium persulfate solution with a concentration of 1.5 mol/L and containing 0.07% by mass of sodium 2-anthraquinonesulfonate for 5 minutes. Thereafter the strip of aluminum foil was left to stand at 40° C. for 10 minutes to effect the oxidative polymerization. The 3,4-ethylenedioxythiophene monomer-containing solution used had a light absorbance of 8.6 at a wavelength of 300 nm.

A cycle comprising the above-mentioned dipping step and polymerization step was repeated 19 times to form a solid electrolyte layer on the aluminum foil.

Finally the thus-produced poly (3,4-ethylenedioxythiophene) was washed in an aqueous bath at 50° C., and then, dried at 100° C. for 30 minutes to give a solid electrolyte layer.

The thickness of the aluminum foil having the solid electrolyte layer was measured by gently sandwiching the foil between the gauge measurement parts of a film thickness gauge ("Peacock Digital dial gauze DG-205" with precision of 3 μm). An average thickness was 198 μm and a standard deviation was 22 μm, as measured on 100 specimens.

The part of aluminum foil with a 3 mm×4 mm size having a solid electrolyte layer formed thereon was again subjected to chemical conversion as follows.

An anode contact was provided on the part of the foil strip of aluminum having a valve action, on which the solid electrolyte layer had not been formed. The part of aluminum foil with a 3 mm×4 mm size having a solid electrolyte layer formed thereon was dipped in an aqueous ammonium adipate solution with a concentration of 15% by mass while a voltage of 3.8 V was applied.

Figure 2:
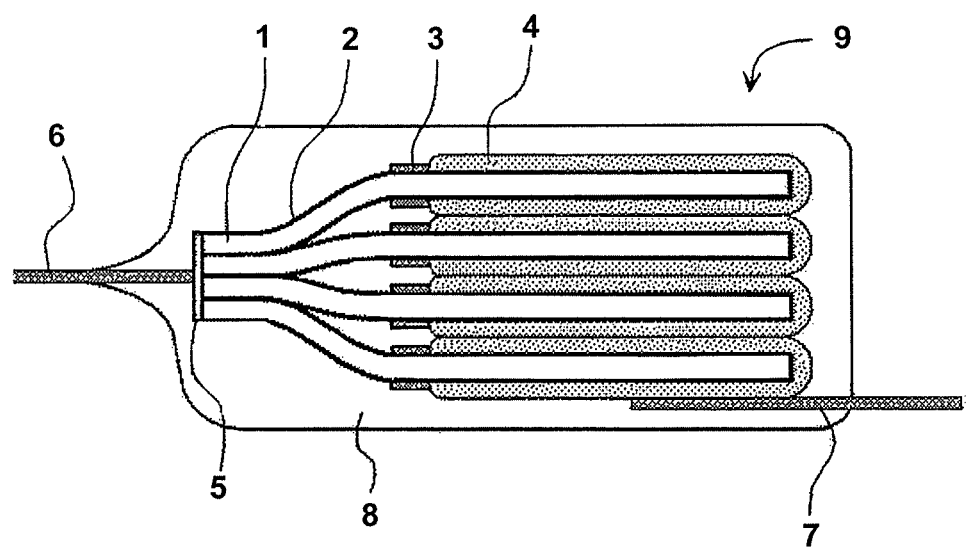
FIG. 2 is a cross-sectional view of an example of a multilayer solid electrolyte capacitor provided with superposed capacitor elements.

The part of each aluminum foil strip 1 having a conductive polymer composition layer formed thereon was coated with a carbon paste and then with a silver paste. Four of the thus-obtained aluminum foil strip were laminated together to form an assembly of the aluminum foil strips as illustrated in FIG. 2. A cathode lead terminal 7 was connected to the assembly of the aluminum foil strips. An anode lead terminal 6 was connected to the assembly of the aluminum foil strips by welding the anode lead terminal 6 to a part of the assembly of the aluminum foil strips, on which part a conductive polymer composition layer had not been formed. A thus-obtained element of the assembly of the aluminum foil strips was encapsulated with an epoxy resin 9, and then was aged at 125° C. for 2 hours while a rated voltage of 2V was applied. Thus 30 capacitors 9 were produced.

Initial characteristics of the 30 capacitors were evaluated as follows. The evaluated initial characteristics were capacitance [μF] at 120 Hz, loss factor [tan δ×100(%)] at 120 Hz, equivalent series resistance (hereinafter referred to "ESR") [Ω], and leakage current [μA]. The leakage current was measured when 1 minute elapsed after the commencement of application of a rated voltage of 2 V. Average values of each measurement result are shown in Table 1. Further, a fraction defective was determined as evaluated by rating a capacitor exhibiting a leakage current of 0.002 CV or larger, as a defective. The fraction defective is also shown in Table 1. The average value of leak currents was calculated on capacitor specimens except for those which were graded as defective.

Example 2

The procedures as described in Example 1 were repeated to make aluminum foil strips each having a solid electrolyte layer formed thereon, wherein the polymerizable monomer-containing solution used was changed to a solution in isopropyl alcohol (IPA) containing 25% by mass of 3,4-ethylenedioxythiophene, 0.007% by mass, as expressed in terms of the concentration of 3,4-ethylenedioxythiophene monomer, of 3,4-ethylenedioxythiophene dimer, and 0.001% by mass, as expressed in terms of the concentration of 3,4-ethylenedioxythiophene monomer, of 3,4-ethylenedioxythiophene trimer. The value as defined by the formula "A/(B+C)" (where A: concentration of the monomer, B: concentration of the dimmer as expressed in terms of the concentration of the monomer, and C: concentration of the trimer as expressed in terms of the concentration of the monomer) was 3.125. Further, the cycle comprising the dipping step and polymerization step was repeated 17 times instead of 19 times to form a solid electrolyte layer. All other conditions remained the same.

The thickness of the aluminum foil strip having the solid electrolyte layer was measured by the same way as described in Example 1. An average thickness was 191 μm and a standard deviation was 23 μm, as measured on 100 specimens.

By the same procedures as described in Example 1, re-chemical conversion, coating of the aluminum foil strips with a carbon paste and a silver paste, lamination together of four strips, connection of cathode lead terminal, encapsulation with an epoxy resin and aging of the encapsulated element of the assembly of laminated foil strips were conducted in turn, to give 30 capacitors.

Initial characteristics of the 30 capacitors were evaluated in the same manner as described in Example 1. The evaluation results are shown in Table 1.

Example 3

The procedures as described in Example 1 were repeated to make aluminum foil strips each having a solid electrolyte layer formed thereon, wherein the polymerizable monomer-containing solution used was changed to a solution in isopropyl alcohol (IPA) containing 30% by mass of 3,4-ethylenedioxythiophene, 0.2% by mass, as expressed in terms of the concentration of 3,4-ethylenedioxythiophene monomer, of 3,4-ethylenedioxythiophene dimer, and 0.007% by mass, as expressed in terms of the concentration of 3,4-ethylenedioxythiophene monomer, of 3,4-ethylenedioxythiophene trimer. The value as defined by the formula "A/(B+C)" (where A: concentration of the monomer, B: concentration of the dimmer as expressed in terms of the concentration of the monomer, and C: concentration of the trimer as expressed in terms of the concentration of the monomer) was 145. Further, the cycle comprising the dipping step and polymerization step was repeated 17 times instead of 19 times to form a solid electrolyte layer. All other conditions remained the same.

The thickness of the aluminum foil strip having the solid electrolyte layer was measured by the same way as described in Example 1. An average thickness was 191 μm and a standard deviation was 23 μm, as measured on 100 specimens.

By the same procedures as described in Example 1, re-chemical conversion, coating of the aluminum foil strips with a carbon paste and a silver paste, lamination together of four strips, connection of cathode lead terminal, encapsulation with an epoxy resin and aging of the encapsulated element of the assembly of laminated foil strips were conducted in turn, to give 30 capacitors.

Initial characteristics of the 30 capacitors were evaluated in the same manner as described in Example 1. The evaluation results are shown in Table 1.

Comparative Example 1

The procedures as described in Example 1 were repeated to make aluminum foil strips each having a solid electrolyte layer formed thereon, wherein the polymerizable monomer-containing solution used was changed to a solution in isopropyl alcohol containing 25% by mass of 3,4-ethylenedioxythiophene. Further, the cycle comprising the dipping step and polymerization step was repeated 18 times instead of 19 times to form a solid electrolyte layer. All other conditions remained the same.

The thickness of the aluminum foil strip having the solid electrolyte layer was measured by the same way as described in Example 1. An average thickness was 155 μm and a standard deviation was 19 μm, as measured on 100 specimens. Thus the aluminum foil strip having the solid electrolyte layer was thinner than those which were made in the examples of the present invention.

As a modified embodiment, the cycle comprising the dipping step and polymerization step was repeated 22 times with all other conditions remaining the same. The thickness of the aluminum foil strip having the solid electrolyte layer was measured by the same way as described in Example 1. An average thickness was 201 μm and a standard deviation was 25 μm, as measured on 100 specimens.

By the same procedures as described in Example 1, 30 capacitors were made from the above-mentioned thin aluminum foil strip having the solid electrolyte layer, and their initial characteristics were evaluated. The evaluation results are shown in Table 1.

Comparative Example 2

The procedures as described in Example 1 were repeated to make aluminum foil strips each having a solid electrolyte layer formed thereon, wherein the polymerizable monomer-containing solution used was changed to a solution in isopropyl alcohol (IPA) containing 25% by mass of 3,4-ethylenedioxythiophene, 0.5% by mass, as expressed in terms of the concentration of 3,4-ethylenedioxythiophene monomer, of 3,4-ethylenedioxythiophene dimer, and 0.04% by mass, as expressed in terms of the concentration of 3,4-ethylenedioxythiophene monomer, of 3,4-ethylenedioxythiophene trimer. The value as defined by the formula "A/(B+C)" (where A: concentration of the monomer, B: concentration of the dimmer as expressed in terms of the concentration of the monomer, and C: concentration of the trimer as expressed in terms of the concentration of the monomer) was 46. All other conditions remained the same.

The thickness of the aluminum foil strip having the solid electrolyte layer was measured by the same way as described in Example 1. An average thickness was 256 μm and a standard deviation was 50 μm, as measured on 100 specimens.

The above-mentioned polymerizable monomer-containing solution used exhibited a light absorbance of 40 at a wavelength of 300 nm.

By the same procedures as described in Example 1, 30 capacitors were made from the above-mentioned aluminum foil strip having the solid electrolyte layer, and their initial characteristics were evaluated. The evaluation results are shown in Table 1.

TABLE 1

| Examples | Initial Characteristics | | | | |
| --- | --- | --- | --- | --- | --- |
| | Capacitance μF | Loss Factor % | ESR Ω | Leakage Current μA | Fraction Defective |
| Example 1 | 107 | 1.1 | 0.010 | 0.20 | 0/30 |
| Example 2 | 108 | 1.0 | 0.010 | 0.17 | 0/30 |
| Example 3 | 106 | 1.1 | 0.011 | 0.16 | 0/30 |
| Example 4 | 105 | 1.5 | 0.013 | 0.25 | 0/30 |
| Comp. Ex. 1 | 104 | 3.6 | 0.024 | 0.25 | 25/30 |
| Comp. Ex. 2 | 106* | 2.0 | 0.013 | 0.31 | 19/30 |

*Non-encapsulated (the whole assembly of the aluminum foil strips could not be encapsulated within epoxy resin.).

INDUSTRIAL APPLICABILITY

The solid electrolyte formed on a dielectric layer of a substrate for a solid electrolyte capacitor by the method of the present invention exhibits enhanced adhesion to the dielectric layer and has a large capacitance, a low loss factor (tan δ), a reduced leakage current and a small fraction defective. Thus, capacitor elements which are thin and have enhanced uniformity in shape, and exhibit minimized short-circuiting can be stably produced.

Therefore, the resulting thin solid electrolytic capacitor elements can give a laminated capacitor exhibiting uniform equivalent series resistance, and having enhanced capacitance by increasing the number of the laminated thin capacitor elements.

The invention claimed is:

1. A method for producing a solid electrolyte comprising the steps of:
   applying a solution containing a five-membered heterocyclic compound as a polymerizable monomer onto a surface of a substrate, and
   polymerizing the applied polymerizable monomer to give a solid electrolyte comprised of an electrically conductive polymer,
   said method being characterized in that the polymerizable monomer-containing solution contains the polymerizable monomer and at least one polymerizable component selected from the group consisting of a dimer of the polymerizable monomer and a trimer of the polymerizable monomer, at a proportion satisfying the following equation:

$$A/(B+C)=100\text{-}1{,}000{,}000$$

where
   A: concentration of the polymerizable monomer,
   B: concentration of the dimer as expressed in terms of the concentration of the polymerizable monomer, and
   C: concentration of the trimer as expressed in terms of the concentration of the polymerizable monomer.

2. The method for producing a solid electrolyte according to claim 1, wherein the five-membered heterocyclic compound as the polymerizable monomer is a monomeric compound selected from the group consisting of a compound having a thiophene skeletal structure, a compound having a pyrrole skeletal structure and a compound having a furan skeletal structure.

3. The method for producing a solid electrolyte according to claim 1, wherein the five-membered heterocyclic compound as the polymerizable monomer is a compound having a thiophene skeletal structure.

4. The method for producing a solid electrolyte according to claim 1, wherein the polymerizable monomer-containing solution contains the polymerizable monomer and at least one polymerizable component selected from the group consisting of a dimer of the polymerizable monomer and a trimer of the polymerizable monomer, at a proportion satisfying the following equation:

$$A/(B+C)=100\text{-}250{,}000$$

where
   A: concentration of the polymerizable monomer,
   B: concentration of the dimer as expressed in terms of the concentration of its monomer, and
   C: concentration of the trimer as expressed in terms of the concentration of its monomer.

5. The method for producing a solid electrolyte according to claim 1, wherein the substrate is comprised of a porous metal body having a valve action and a dielectric layer formed on a surface of the porous metal body.

6. The method for producing a solid electrolyte according to claim 1, wherein the polymerization of the applied polymerizable monomer is carried out in the presence of an oxidizing agent.

7. The method for producing a solid electrolyte according to claim 1, which comprises conducting at least one cycle comprising the steps of:
   applying the polymerizable monomer-containing solution onto a dielectric layer formed on the surface of substrate, and then drying a thus-deposited coating of the applied polymerizable monomer-containing solution; and,
   applying a solution containing an oxidizing agent onto the dried coating of the polymerizable monomer-containing solution on the dielectric layer-formed surface of substrate, and then maintaining in an air atmosphere the substrate having the surface having applied thereto the oxidizing agent-containing solution to effect polymerization of the polymerizable monomer, followed by drying a coating containing a thus-formed polymer.

8. The method for producing a solid electrolyte according to claim 1, wherein the produced solid electrolyte is comprised of an electrically conductive polymer having a polymerization degree in the range of 5 to 2,000.

9. A solid electrolyte capacitor characterized as being provided with a solid electrolyte produced by the production method as claimed in claim 1.

10. A method for producing a solid electrolyte comprising the steps of:
    applying a solution containing a compound having a thiophene skeletal structure as a polymerizable monomer onto a surface of a substrate, and polymerizing the applied polymerizable monomer to give a solid electrolyte comprised of an electrically conductive polymer,
    said method being characterized in that the solution containing the compound having a thiophene skeletal structure as applied onto the substrate surface has a light absorbance in the range of 1.5 to 10 at a wavelength of 300-340 nm.

11. The method for producing a solid electrolyte according to claim 10, wherein the polymerizable monomer-containing solution contains the compound having a thiophene skeletal structure at a concentration in the range of 3% to 75% by mass.

12. The method for producing a solid electrolyte according to claim 10, wherein the polymerizable monomer-containing solution contains the compound having a thiophene skeletal structure as the polymerizable monomer, and at least one polymerizable component selected from the group consisting of a dimer of the polymerizable monomer and a trimer of the polymerizable monomer, at a proportion satisfying the following equation:

$$A/(B+C)=100\text{-}1{,}000{,}000$$

where
   A: concentration of the polymerizable monomer,
   B: concentration of the dimer as expressed in terms of the concentration of its monomer, and
   C: concentration of the trimer as expressed in terms of the concentration of its monomer.

13. The method for producing a solid electrolyte according to claim 10, wherein the polymerizable monomer-containing solution contains the polymerizable monomer and at least one polymerizable component selected from the group consisting of a dimer of the polymerizable monomer and a trimer of the polymerizable monomer, at a proportion satisfying the following equation:

$$A/(B+C)=100\text{-}250{,}000$$

where
   A: concentration of the polymerizable monomer,
   B: concentration of the dimer as expressed in terms of the concentration of its monomer, and
   C: concentration of the trimer as expressed in terms of the concentration of its monomer.

14. The method for producing a solid electrolyte according to claim 10, wherein the substrate is comprised of a porous metal body having a valve action and a dielectric layer formed on a surface of the porous metal body.

15. The method for producing a solid electrolyte according to claim 10, wherein the polymerization of the applied polymerizable monomer is carried out in the presence of an oxidizing agent.

16. The method for producing a solid electrolyte according to claim 10, which comprises conducting at least one cycle comprising the steps of:
    applying the polymerizable monomer-containing solution onto a dielectric layer formed on the surface of substrate, and then drying a thus-deposited coating of the applied polymerizable monomer-containing solution; and,
    applying a solution containing an oxidizing agent onto the dried coating of the polymerizable monomer-containing solution on the dielectric layer-formed surface of substrate, and then maintaining in an air atmosphere the substrate having the surface having applied thereto the oxidizing agent-containing solution to effect polymerization of the polymerizable monomer, followed by drying a coating containing a thus-formed polymer.

17. The method for producing a solid electrolyte according to claim 10, wherein the produced solid electrolyte is comprised of an electrically conductive polymer having a polymerization degree in the range of 5 to 2,000.

18. A solid electrolyte capacitor characterized as being provided with a solid electrolyte produced by the production method as claimed in claim 10.

\* \* \* \* \*